United States Patent [19]

Agarwal et al.

[11] Patent Number: 4,678,762

[45] Date of Patent: Jul. 7, 1987

[54] VERY SMOOTH AND FLAT POLYCRYSTALLINE ALUMINA SUBSTRATES FROM DIRECT FIRING

[75] Inventors: Anil K. Agarwal, Camarillo, Calif.; Robert A. Hay, Dudley, Mass.

[73] Assignee: Norton Company, Worcester, Mass.

[21] Appl. No.: 787,240

[22] Filed: Oct. 15, 1985

Related U.S. Application Data

[63] Continuation-in-part of Ser. No. 698,219, Feb. 4, 1985, abandoned.

[51] Int. Cl.[4] ............................................. C04B 35/10
[52] U.S. Cl. ................................... 501/127; 501/119; 501/153
[58] Field of Search .................... 501/153, 127, 119

[56] References Cited

U.S. PATENT DOCUMENTS

| | | | |
|---|---|---|---|
| 2,966,719 | 1/1961 | Park, Jr. | 264/63 |
| 3,698,923 | 10/1972 | Stetson et al. | 501/153 |
| 3,740,243 | 6/1973 | Kappes et al. | 264/63 |
| 4,045,412 | 8/1977 | Yamada et al. | 501/119 X |
| 4,217,337 | 8/1980 | Yamada et al. | 501/153 X |

OTHER PUBLICATIONS

Snook, "As-Fired vs Lapped-and-Polished Substrates for Thick- and Thin-Film Hybrid Circuits", Proc. IEEE, vol. 59, (Aug. 1971), pp. 1202–1213.

Snook, "As Fired vs Lapped-and-Polished Substrates for Thick and Thin Film Hybrid Circuits", Microelectronic Manufacturing and Testing, Oct. 1983.

Wheildon, Modern Materials: Advances in Development and Applications, vol. 2, pp. 111–115, Academic Press, 1960.

Parish et al, "Narrow Size Distribution Powders from Commercial Ceramic Powders", Ceramic International, 75, 10, 1984.

*Primary Examiner*—William R. Dixon, Jr.
*Assistant Examiner*—Karl Group
*Attorney, Agent, or Firm*—Frank S. Chow; Eugene C. Rzucidlo

[57] ABSTRACT

This invention provides thin, flat, water-impervious polycrystalline ceramic bodies composed of at least 99.5% by weight alumina, predominantly in the alpha crystal form. These bodies have a density of at least 3.9 Mg/m$^3$, an average surface roughness of 44 nm or less, typically 40 nm or less. The properties of the finished ceramic bodies make them ideal substrates for highly reliable electronic components, especially for high temperature environments. Processes for obtaining such bodies by direct firing of slip cast tapes are also described.

10 Claims, 4 Drawing Figures

VERY SMOOTH AND FLAT POLYCRYSTALLINE ALUMINA SUBSTRATES FROM DIRECT FIRING

CROSS-REFERENCE TO RELATED APPLICATION

This application is a continuation-in-part of our copending application Ser. No. 06/698,219 filed Feb. 4, 1985 now abandoned.

BACKGROUND OF THE INVENTION

1. Field of the Invention

This invention relates generally to ceramics and more particularly to the efficient production of high alumina bodies with very smooth surfaces. Such bodies, particularly when thin and flat, are especially valuable as substrates for the construction of electronic devices adapted to service in high reliability applications.

The widespread commercial use of thin film devices is dependent on the availability of substrates with high surface smoothness (particularly freedom from surface voids), uniform small grain size surface microstructure, high flatness, and high density, so that the effectiveness of the electrically controlling components is not vitiated by irregularities of the surface on which they are deposited. For example, a tantalum capacitor in a thin film microcircuit might have a thickness of only a few hundred Angstroms. If the substrate surface had a roughness of 0.5 micron, which is 5000 Angstroms, a tantalum layer across such a variation in the surface might well be discontinuous. Even if the tantalum film were in fact continuous across a surface variation, the divergence of the tantalum from its expected planar shape might significantly vary its capacitance from the expected value, leading to an ineffective circuit. Specifically, surface roughness of no more than 25 nanometers (nm) is desirable, although in practice roughnesses up to about 100 nm can be tolerated in many cases.

In microstrip applications, where the substrate is an active part of the circuit, porosity in the bulk of the substrate, which affects its dielectric properties, plays a major role in the reliability of the circuit. Uniform pore size distribution in the substrate is essential for its use in the gigahertz frequency range.

2. Description of the Prior Art

When considering means of attaining adequate surface smoothness on alumina components for electronics applications, there is an important practical distinction between essentially single crystal forms of alumina such as ruby and sapphire and the much more common polycrystalline bodies in more general use. Single crystal forms of alumina must normally be grown from melts in shapes substantially controlled by the natural characteristics of the crystal itself. The crystals are then machined to the shape desired for use, and the surfaces can be polished to whatever surface smoothness is required. For these and other reasons, single crystal forms of alumina are relatively expensive.

Because of their lower cost, polycrystalline alumina bodies are much more commonly used. Such bodies can be made in almost any shape desired by pressing or casting alumina powders mixed with appropriate binders well known in the art, then firing the pressed cast bodies to sinter the powders into a dense and coherent polycrystalline body. If care is taken, as for example is taught in U.S. Pat. No. 3,678,923 to Stetson and Gyurk, hereinafter cited as Stetson, these polycrystalline bodies often can be used in the as-fired condition. If greater smoothness is needed, it can be obtained by lapping and polishing techniques, as reviewed by John B. Snook, "As-Fired vs. Lapped-and-Polished Substrates for Thick- and Thin-Film Hybrid Circuits", *Microelectronic Manufacturing and Testing*, October 1983. Despite the ability to achieve average surface smoothness on polycrystalline substrates as low as 12 nm, as shown in Snook Table 1, exposure of relatively large microvoids on the surface is still common, as shown in Snook FIG. 5, and capable of causing the sort of difficulties already discussed. Furthermore, surface polishing can not remove subsurface pores, and the lapping and polishing processes can be slow and expensive.

The Stetson reference already cited describes the last significant advance in preparation of smooth electronic substrates by direct firing known to the applicants before their own invention. This patent also contains, at column 2 line 43 to column 3 line 8, substantial detail about the meanings and techniques of surface flatness and surface roughness measurements, which are hereby incorporated by reference. In the instant application, as in Stetson, surface roughness measurements will be given as measured according to the center line average or arithmetic average (AA) method. The measurements of surface roughness described herein were carried out with a commercially available instrument, the Tallysurf, available from Rank-Taylor-Hobson of Leicester, England, which as a precision of ±2.5 nm.

The Stetson specification teaches the use of extensive mixing in organic solvent, along with other expedients, to achieve alumina powders which can be tape cast to give continuous thin substrates with surface finishes as fired between about 50 and 90 nm. Although no explanation is offered for such a relationship by either Stetson or the instant applicants, the graphs disclosed by Stetson, particularly Stetson FIGS. 5A and B and 6A and B, are strongly suggestive of an asymptotic mathematical function, with the asymptote at about 50 nm. With or without a theoretical explanation, the data shown by Stetson indicate very strongly that 47-50 nm is the practical limit of surface finish achievable by the use of long mixing and/or low sintering temperatures, the primary techniques taught by Stetson for achieving good surface finish. Particularly significant in this regard is the observation (in column 7 lines 59-65 of the Stetson specification) that doubling the longest mixing time shown on the Stetson Figures did not result in any measurable increase in the surface area (and possibly in surface finish as taught by Stetson) of the milled alumina powder.

A characteristic of the processes disclosed by Stetson and the other prior art is a requirement of the use of size-graded or size-ranged mixtures of alumina powders in order to obtain non-porous final fired bodies. As expressed by Stetson at column 3 lines 65-66, "Little particles must be available to fill in the holes between the big particles."

Another method of obtaining a fine grain dense aluminum body is by hot pressing as described by W. M. Wheildon in *Modern Materials*, Vol. 2, p. 111 (published by Academic Press, 1960). By grinding and polishing such products, very smooth average surface finishes can be obtained. However, the grinding and polishing operations result in grain pullouts and thus defects in the surface at least as large as the grain size of the body. In summary, the prior art teaches how to obtain by direct firing ceramic substrates with water-impervious surfaces having a roughness of 50 nm. However, the substrates obtained have a relatively low density of 3.7 megagrams per cubic meter (Mg/m$^3$) compared to a theoretical density for Al$_2$O$_3$ of 3.97 Mg/m$^3$ (Stetson column 12, lines 35–40).

SUMMARY OF THE INVENTION

It has now been found that water-impervious polycrystalline alumina substrates with surface finishes as fine as 25 nm, average grain sizes less than 0.4 micron, 99.5% or better alumina purity, and bulk specific gravity of at least 3.9 Mg/m$^3$ can be reproducibly achieved by direct firing. To achieve these results, the Stetson and other prior art teachings of using size graded powders have been completely abandoned. Instead, narrowly sized dispersions of alumina, with particle size ranges usually no more than 0.3 microns in breadth and preferably no more than 0.2 microns, are used to prepare slips for casting by conventional means. The surface finish of the substrates obtained by firing such slips made from narrowly graded alumina particle size fractions is directly correlated with the particle size in the fraction. In particular, if the particle size of alumina in the centrifuged fraction is 0.1–0.3 microns, the surface finish is no rougher than about 40 nm AA and in some instances as low as 30 nm AA.

DESCRIPTION OF THE PREFERRED EMBODIMENTS

Figure 1:
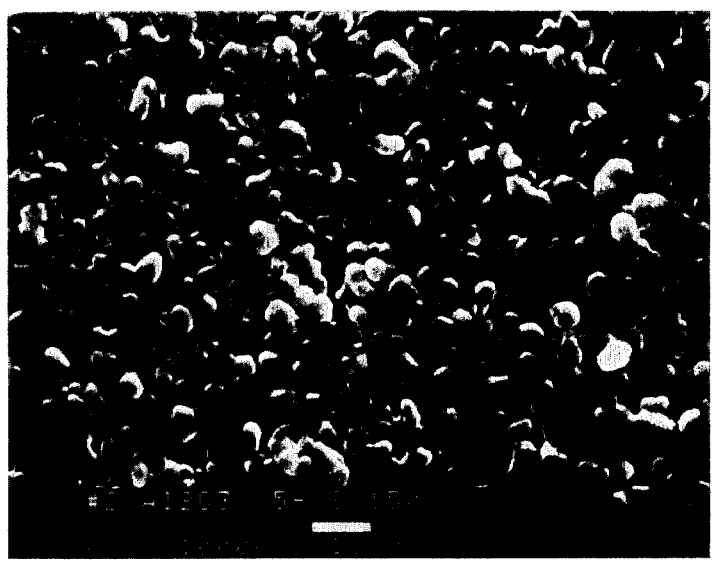
FIGS. 1 through 4 are all photomicrographs of fired alumina substrate surfaces.

With suitable preparation and grinding steps well known in the art, any source of alumina could be used for the products and processes to be described here by bringing it to an appropriate purity and particle size distribution. In some cases it is advantageous to add one of the grain growth inhibitors for aluminum known from the prior art. Magnesia in an amount from 0.01–0.3% of the total powder weight is a suitable inhibitor.

For commercial convenience and economy, the normal starting material will be a commercially available high purity alumina powder with a surface area of at least 11 square meters per gram (m$^2$/gm). Such powders can be prepared by a variety of known methods. A suitable material actually used for much of the work to be described is type A-16 SG supplied by the Aluminum Company of America. This powder is then processed to obtain the narrow size dispersions of alumina by techniques well known in the prior art, such as those described by M. Parish and H. K. Bowen, "Narrow Size Distribution Powders from Commercial Ceramic Powders", *Ceramics International*, 75, 10, n. 2, 1984. As generally recognized in the prior art, the use of a deflocculant during dispersion of narrow size powders is necessary to achieve adequate dispersion and avoid the formation of undesirable alumina aggregates. Many deflocculants, including those discussed by Stetson are acceptable, but fish oil, p-hydroxybenzoic acid, or glycerol trioleate are usually preferred. The amount of deflocculant used ranges from 0.1% to 1.0% by weight of the alumina powder.

Different fractions containing narrow size powders with a particle size range corresponding to the surface smoothness desired in the final substrate are selected for slip casting. For example, if the particle size range of 0.1–0.3 microns is selected by techniques described in the aforementioned Parish paper, the surface finish of the fired body will generally be 40 nm or better. If the particle size range of 0.5–0.7 microns is selected, an as-fired surface finish of about 80 nm will result.

The separation and size narrowing steps described above are unnecessary for powders produced directly in a narrow size range by chemical or vapor phase processes, and the invention described here can be practiced by directly using as-received powder of this type in appropriate size ranges.

A narrow size alumina powder obtained by one of the means described above should be suspended for mixing in a suitable liquid. The liquid chosen should be one which, either alone, or in a suitable mixture with other liquids, will dissolve an effective binder material and any plasticizers needed for the binder and can be readily driven off in the drying stage after later casting. Organic liquids are generally preferred because of low viscosity, high volatility, and ability to dissolve common binders and plasticizers. A mixture of two liquids is often preferred in the casting slip over a single liquid, because ordinarily such mixtures have lower viscosity than their constituents. To avoid having one component of the mixture driven off prior to the other or others, which can create difficulty during drying, the liquid mixture chosen should preferably be azeotropic. Because any water present in the casting during firing is usually deleterious, organic liquids or mixtures thereof capable of dissolving water and thereby promoting its expulsion during drying are also preferred. A particularly preferred liquid mixture consists of 1-butanol, 2-propanol, and xylene.

It is preferred that during the mixing stage all the components of the eventual liquid mixture to be used during casting should be present. This contrasts with the Stetson teaching, in which milling and mixing take place in two distinct steps, for much longer period of time than the present invention.

The preferable binder is polyvinylbutyral, although methyl methacrylate or cellulose acetate butyral polymers can also be used. Polyethylene glycol and butyl benzyl phthalate are preferred as plasticizers, in a ration of 50–300 parts of each per hundred parts of binder. Mixing should then be continued for 0.5–48 hours.

The present applicants have found that a vibratory mill such as the Sweco Model M-18 sold by Sweco, Inc., in addition to conventional ball mills as taught by Stetson, gives very effective mixing. With either type of mill, only 0.5–48 hours of mixing is needed, in contrast to the periods of up to 120–250 hours taught by Stetson. Conventional organic (e.g., polytetrafluoroethylene) or ceramic mixing media are used, with borundum preferred. The composition of borundum is about 85% Al$_2$O$_3$, 12% SiO$_2$, 2% MgO, and 1% CaO. The amount of silica, magnesia, and calcia introduced during mixing for the time specified is not deleterious; in fact, these materials would serve as grain growth inhibitors if presence is significant. The present applicants have found no advantage or necessity for additional grain growth inhibitors such as the talc recommended by Stetson. Naturally, grinding media with constituents which are known to be deleterious to the sintering of alumina, even when present in small amounts, should be avoided.

Conventional deaeration and tape casting of the slip, drying of the cast sheet, and final firing follow the provision of the narrowly sized slurry. In some cases a deagglomerating step introduced between the deaeration and casting has been found to be advantageous. Deagglomerating may be accomplished by passing through a fine screen such as a 400 mesh screen, or by other conventional techniques. A firing temperature of 1300°–1500° C. and 0.25–2 hours firing time are preferred.

The scope of the invention can be further appreciated from the following Examples.

EXAMPLE 1

A slurry was prepared having the following composition in parts by weight:

| | |
|---|---|
| alumina | 581 parts |
| 1-butanol | 154 parts |
| 2-propanol | 73 parts |
| xylene | 73 parts |
| polyvinyl butyral | 25 parts |
| glycerol trioleate | 5 parts |
| butyl benzyl phthalate | 49 parts |
| polyethylene glycol | 40 parts |

Figure 2:
Figure 3:

The slurry was milled with borundum grinding media of 1.25 cm diameter in the Sweco M-18 mill for six hours. The alumina powder used to make the slurry had at least 90% of its alumina particles between 0.5 and 0.8 microns in size. The slurry was then deaerated and tape cast to give a fired thickness of 0.67 mm. The cast tape was dried overnight and sintered for one hour at 1500° C. The resulting substrate plates were flat, and a density of 3.9 Mg/m$^3$, a grain size of less than one micron, and a surface roughness in the range 100–125 nm. A scanning electron micrograph of the fired surface is shown in FIG. 1. FIGS. 2 and 3 show micrographs under similar conditions of commercial substrates from Materials Research Corporation, Orangeburgh, NY, believed to be prepared by the Stetson technique. These conventional products have much larger grain size.

EXAMPLE 2

Figure 4:

A slurry was prepared similarly to that of Example 1, except that the alumina used had a particle size range 90% between 0.2 and 0.5 microns. Other procedures were the same as for Example 1. The surface structure of the resulting fired substrate is shown in FIG. 4. The grain size is less than 0.5 micron. The surface smoothness was in the range of 50–75 nm.

EXAMPLE 3

For this example, an alumina powder with 99.5% chemical purity and with at least 90% of its particles in the size range from 0.1 to 0.3 microns was used. The powder was sized to this range in a mixture of 2-propanol and glycerol trioleate. Of this powder, 600 grams was slurried with 148.4 grams of 2-propanol, 191.4 grams of xylene, and 4.7 grams of fish oil deflocculant. To this a separately prepared mixture of 27.4 grams of polyvinyl butyral resin binder, 43.9 grams of poly(ethylene glycol) plasticizer, and 53.7 grams of butyl benzyl phthalate plasticizer was then added to the slurry and mixed for 4 hours. At this point the mill was opened and 200 ml of a mixture of 2-propanol and xylene in the weight ratio of 1484:1914 was added to adjust viscosity for efficient mixing. Mixing in the mill was then continued for an additional 20 hours.

After this mixing, the slurry was deaerated for 1 hour, then passed through a 400 mesh screen to deagglomerate it. The deaerated and deagglomerated slurry was tape cast, using a doctor blade gap of 0.75 mm, and the casting was dried, in the manner conventional in the manufacture of electronic substrates by tape casting, over a period of time 70–100 hours, to promote slow but thorough elimination of the organic binder without forming even small surface blisters. Final sintering after the completion of drying was at 1450° C. for 15 minutes, to yield a flat substrate plate with an as-fired surface finish of 37.5±2.5 nm and an as-fired density of 3.9 Mg/m$^3$.

EXAMPLE 4

Employing the same procedure and starting powders as described in Example 3, but increasing the final mixing time of the liquid slurry in the mill to about 48 hours, a final product which was fired at 1475° C. for 30 minutes, having an average surface finish of 30 nm±2.5 nm was obtained.

Although the practice of this invention has been illustrated primarily by the use of alumina, substrates of other ceramic powders such as zirconia, silicon carbide, silicon nitride, aluminum nitride and composites can be similarly prepared.

We claim:

1. An as-fired thin, flat, water-impermeable sintered polycrystalline ceramic body consisting essentially of at least 99.5% by weight alpha-alumina said ceramic body having a density of at least 3.9 Mg/m$^3$, and an average surface roughness on both major surfaces not greater than 44 nm said alumina being made from generally uniformly sized particles such that 98% have a size of less than 1. micron and more than 90% are within a size range of about 0.3 microns or less.

2. An as-fired thin, flat, water-impermeable sintered polycrystalline ceramic body according to claim 1 which has an average surface roughness of 30 nm±2.5 nm.

3. A body according to claim 1 produced by firing at a temperature between 1300° and 1500° C. for a period of from 0.25 to 2 hours of a dried ceramic green body prepared by slip casting from a slurry having at least 90% of its alumina particles within a size range no broader than 0.3 micron, and with 98% of its particles being less than 1 micron in size.

4. A body according to claim 3, wherein the alumina content of said slurry consists of particles not larger than 0.4 microns, with 90% of said particles having a size between 0.1 and 0.3 microns.

5. In a process for the production of thin, flat, water-impermeable sintered polycrystalline ceramic substrates by tape casting a slurry of ceramic powder, drying to give a greenwave substrate, and firing to give a coherent ceramic substrate, the improvement wherein the ceramic powder used to prepare said slurry is processed to obtain a narrow particle size dispersion such that the ceramic powder in such slurry has at least 90% of its particles within a size range not broader than 0.3 microns and also 98% of its particles are less than 1 micron in size.

6. A process according to claim 5, wherein said slurry is deagglomerated before slip casting.

7. A process according to claim 5 wherein said ceramic powder in said slurry has at least 90% of its particles within the size range from 0.1 to 0.3 microns.

8. A thin, flat, water-impermeable non-fused polycrystalline ceramic body consisting essentially of at least 99.5% by weight of alpha-alumina said ceramic body having a density of at least 3.9 Mg/m$^3$ and being capable of being ground or polished to a ceramic body which is substantially free of surface defects having an average surface roughness not greater than 44 nm wherein said ceramic body is prepared from an alumina slurry having at least 90% of its alumina particles within a size range of no broader than 0.3 micron, and with 98% of its particles less than 1 micron in size.

9. A body according to claim 8, which has a grain size of less than one micron and which is prepared from a slurry having at least 90% of its alumina particles between 0.5 and 0.8 microns.

10. A body according to claim 8 which has a grain size of less than 0.5 micron and which is prepared from a slurry having at least 90% of its alumina particles between 0.2 and 0.5 microns.

* * * * *

UNITED STATES PATENT AND TRADEMARK OFFICE
CERTIFICATE OF CORRECTION

PATENT NO. : 4,678,762
DATED : July 7, 1987
INVENTOR(S) : Anil K. Agarwal and Robert A. Hay It is certified that error appears in the above-identified patent and that said Letters Patent is hereby corrected as shown below:

Claim 5 line 4 "greenwave" should read --greenware--

Signed and Sealed this

Eighth Day of December, 1987

Attest:

DONALD J. QUIGG

Attesting Officer

Commissioner of Patents and Trademarks